US012665303B2

(12) United States Patent
Uchida

(10) Patent No.: US 12,665,303 B2
(45) Date of Patent: Jun. 23, 2026

(54) ANTENNA DEVICE

(71) Applicant: JAPAN AVIATION ELECTRONICS INDUSTRY, LIMITED, Tokyo (JP)

(72) Inventor: Jun Uchida, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 72 days.

(21) Appl. No.: 18/669,545

(22) Filed: May 21, 2024

(65) Prior Publication Data

US 2024/0413534 A1 Dec. 12, 2024

(30) Foreign Application Priority Data

Jun. 12, 2023 (JP) ................................ 2023-095980

(51) Int. Cl.
*H01Q 9/04* (2006.01)
*H01Q 1/50* (2006.01)

(52) U.S. Cl.
CPC ............ *H01Q 9/0407* (2013.01); *H01Q 1/50* (2013.01)

(58) Field of Classification Search
CPC ........ H01Q 9/0407; H01Q 1/50; H01Q 13/10; H01Q 1/36; H01Q 1/42; H01Q 5/10; H01Q 5/20; H01Q 5/30; H01Q 5/314; H01Q 9/06
See application file for complete search history.

(56) References Cited

U.S. PATENT DOCUMENTS 3,065,752 A 11/1962 Fritz
9,203,139 B2 12/2015 Zhu et al.
10,186,753 B2 1/2019 Asou et al.
10,418,686 B2 9/2019 Zhao et al.
11,251,531 B2 2/2022 Matsuura
(Continued)

FOREIGN PATENT DOCUMENTS

JP 2012175422 A 9/2012
JP 2012231266 A 11/2012
(Continued)

OTHER PUBLICATIONS

Extended European Search Report (EESR) dated Oct. 25, 2024, issued in counterpart European Application No. 24177644.2.
(Continued)

*Primary Examiner* — Seung H Lee
(74) *Attorney, Agent, or Firm* — Holtz, Holtz & Volek PC

(57) ABSTRACT

An antenna device comprises a case and an antenna element. The antenna element is arranged in the case and radiates a radio wave with a predetermined frequency which has a plane of polarization in parallel to a predetermined plane. The case is formed with a predetermined opening. The predetermined opening has two main openings and a coupling opening. The two main openings are apart from each other in a first direction perpendicular to the predetermined plane. The coupling opening couples the two main openings together in the first direction. The coupling opening has a size smaller than another size of each of the two main openings in a second direction perpendicular to the first direction. The predetermined opening forms a split ring resonator which resonates at the predetermined frequency and radiates a radio wave corresponding to the radio wave radiated from the antenna element.

8 Claims, 4 Drawing Sheets

(56) References Cited

U.S. PATENT DOCUMENTS

| | | | | |
|---|---|---|---|---|
| 2012/0268343 | A1 | 10/2012 | Yanagi et al. | |
| 2015/0138034 | A1* | 5/2015 | Su | H01Q 1/526<br>343/842 |
| 2022/0102874 | A1 | 3/2022 | Khripkov et al. | |

FOREIGN PATENT DOCUMENTS

| | | | |
|---|---|---|---|
| JP | 2017098872 | A | 6/2017 |
| JP | 2018129595 | A | 8/2018 |
| JP | 6386436 | B2 | 9/2018 |
| JP | 2020109903 | A | 7/2020 |
| KR | 20180002846 | A | 1/2018 |
| TW | 201351779 | A | 12/2013 |
| TW | 201535863 | A | 9/2015 |
| WO | 2012160982 | A1 | 11/2012 |

OTHER PUBLICATIONS

Korean Office Action (and an English language translation thereof) dated Jun. 4, 2025, issued in counterpart Korean Application No. 10-2024-0061431.

Taiwanese Office Action (and an English language translation thereof) dated Aug. 27, 2025, issued in counterpart Taiwanese Application No. 113118888.

* cited by examiner

ANTENNA DEVICE

CROSS REFERENCE TO RELATED APPLICATIONS

This application is based on and claims priority under 35 U.S.C. § 119 to Japanese Patent Application No. JP 2023-095980 filed Jun. 12, 2023, the content of which is incorporated herein in its entirety by reference.

BACKGROUND OF THE INVENTION

This invention relates to an antenna device comprising a case made of conductor and an antenna element arranged in the case.

For example, this type of antenna device is disclosed in JP2017-098872A (Patent Document 1), the content of which is incorporated herein by reference.

Referring to FIG. 7, Patent Document 1 discloses an antenna device 90 comprising a case 92 formed of metal plates and an antenna element 98 arranged in the case 92. The case 92 has a side plate which is formed with a vertically extending slot 94. The slot 94 has a length corresponding to a predetermined frequency which is a frequency of a radio wave radiated from the antenna element 98. Specifically, the length of the slot 94 is designed to be about half a wavelength of the radio wave which has the predetermined frequency. The thus-formed slot 94 resonates with the radio wave radiated from the antenna element 98, and thereby a radio wave with the predetermined frequency is radiated outward from the case 92.

For example, when the predetermined frequency of the antenna element 98 is 2.4 GHz, the slot 94 (opening) needs to have a length of about 60 mm. From another viewpoint, the case 92 is an accommodation member for accommodating members such as the antenna element 98 and a circuit board. Considering only necessity of the case 92 as the accommodation member, the case 92 may have a height lower than 60 mm. When the necessary height of the case for accommodating the members is lower than 60 mm, the case 92 should be made higher than the necessary height so that the side plate of the case 92 can be formed with a high opening, or the case 92 should be formed with an opening which extends over an upper and lower plates of this low case 92 as shown in FIG. 7. According to the former solution, the strength of the case 92 is not greatly lowered, but the case 92 should be made high at the expense of design flexibility. According to the latter solution, the case 92 can be reduced in height, but the strength of the case 92 is lowered because of the opening formed on the case 92. The height of the opening formed on the case 92 should be lowered so that both the strength and the design flexibility of the case 92 are satisfied.

SUMMARY OF THE INVENTION

It is therefore an object of the present invention to provide an antenna device comprising a case formed with an opening which corresponds to a radio wave of an antenna element and which can be reduced in height.

An aspect of the present invention provides an antenna device comprising a case made of conductor and an antenna element. The antenna element is arranged in the case and is configured to radiate a radio wave with a predetermined frequency which has a plane of polarization in parallel to a predetermined plane. The case is formed with a predetermined opening. The predetermined opening has two main openings and a coupling opening. The two main openings are apart from each other in a first direction perpendicular to the predetermined plane. The coupling opening couples the two main openings together in the first direction. The coupling opening has a size smaller than another size of each of the main openings in a second direction perpendicular to the first direction. The predetermined opening forms a split ring resonator which resonates at the predetermined frequency. The predetermined opening is configured to radiate a radio wave, which corresponds to the radio wave radiated from the antenna element, outward from the case.

The predetermined opening of an aspect of the present invention works as an LC resonator which has an inductance component mainly formed of the main openings and a capacitance component mainly formed of the coupling opening. The thus-formed LC resonator resonates with various radio waves having various frequencies by adjusting the shapes and the sizes of the main openings and the coupling opening, for example, with no change of the height of the case. Thus, an aspect of the present invention provides the antenna device comprising the case formed with the opening which corresponds to the radio wave of the antenna element and which can be reduced in height.

An appreciation of the objectives of the present invention and a more complete understanding of its structure may be had by studying the following description of the preferred embodiment and by referring to the accompanying drawings.

Figure 1:
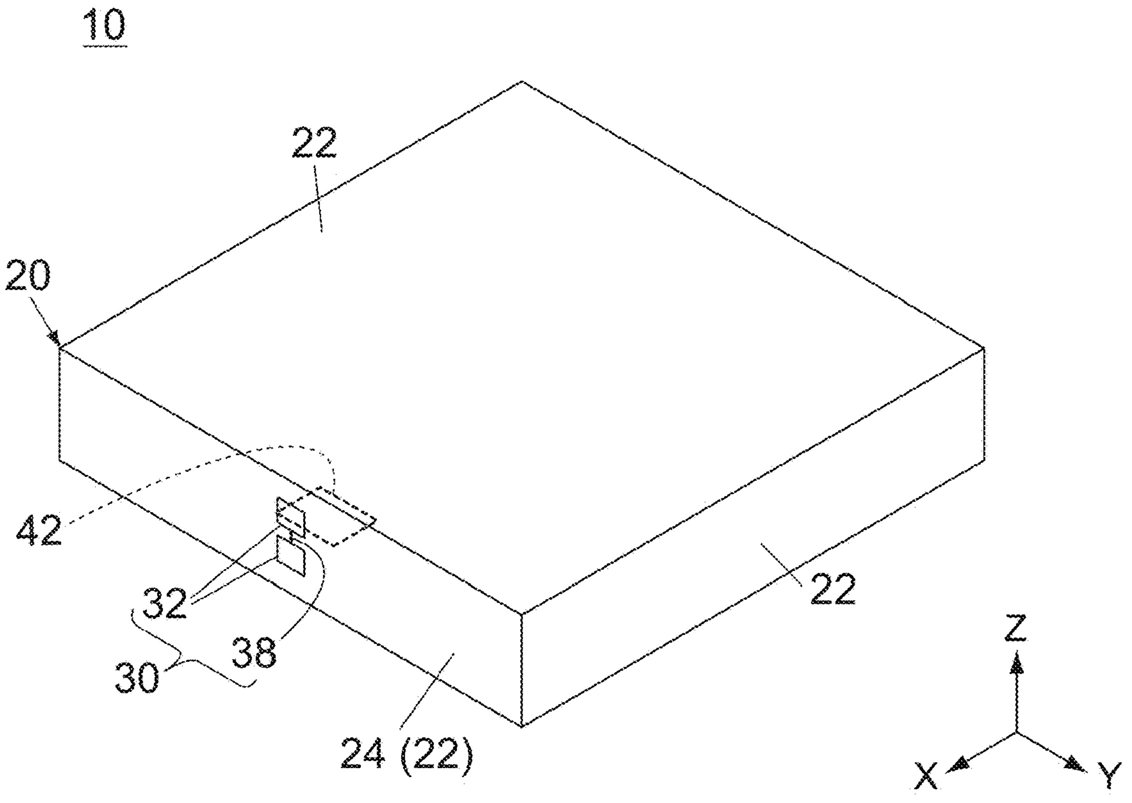
FIG. 1 is a perspective view showing an antenna device according to an embodiment of the present invention, wherein a position of an antenna element arranged in a case is illustrated with dashed line.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Referring to FIG. 1, an antenna device 10 according to an embodiment of the present invention comprises a case 20 made of conductor and an antenna element 42 made of conductor. The case 20 of the present embodiment is formed of six metal plates 22 connected to each other and has a rectangular parallelepiped shape. The antenna element 42 of the present embodiment is arranged in the case 20 and is enclosed by the six metal plates 22. The antenna device 10 of the present embodiment has the aforementioned structure. However, the present invention is not limited thereto. For example, the material and the shape of the case 20 can be variously modified as necessary.

Figure 5:
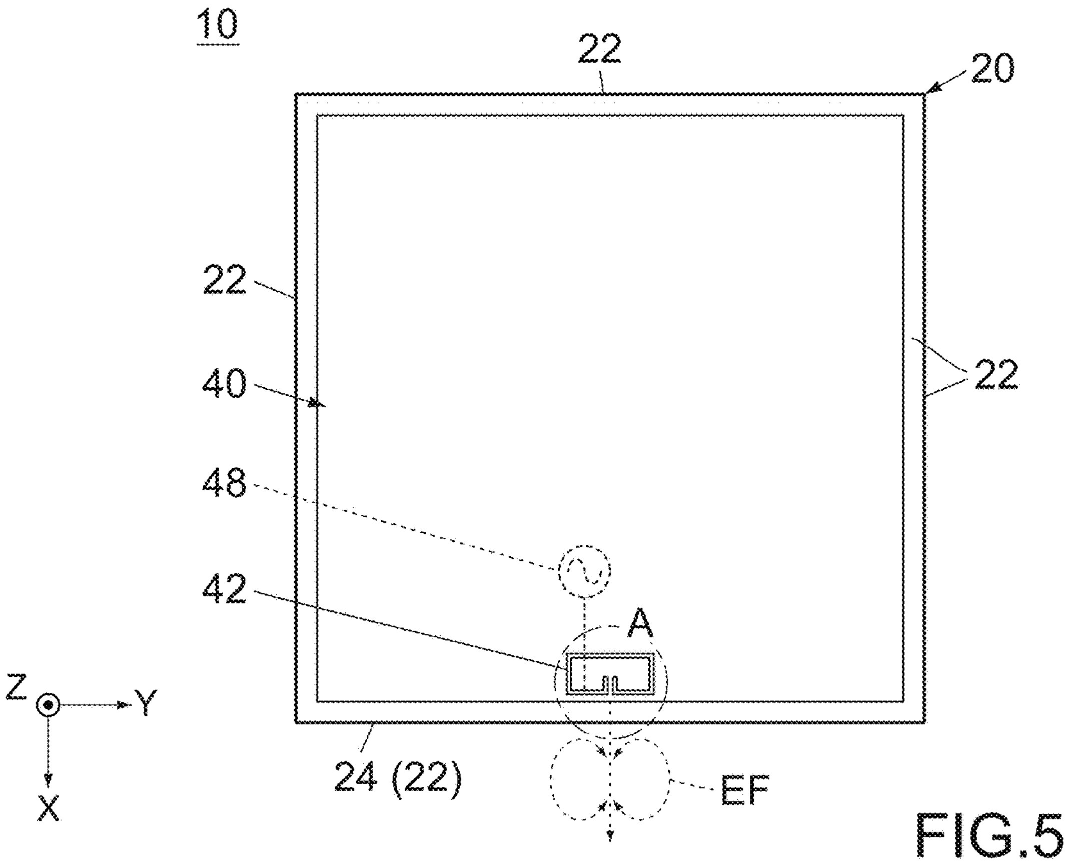
FIG. 5 is a cross-sectional view showing the antenna device of FIG. 2, taken along line V-V.

Referring to FIG. 5, the antenna device 10 of the present embodiment comprises a printed circuit board 40. The printed circuit board 40 is arranged in the case 20. The antenna element 42 is provided on an upper surface of the printed circuit board 40. The printed circuit board 40 is provided with a feeding portion 48 in addition to the antenna element 42. The antenna element 42 radiates a radio wave with a predetermined frequency in response to signals fed by the feeding portion 48. The printed circuit board 40 of the present embodiment comprises the aforementioned components. However, the present invention is not limited thereto. For example, the printed circuit board 40 may comprise various components such as a processing device which sends and receives signals in addition to the aforementioned components.

Figure 6:
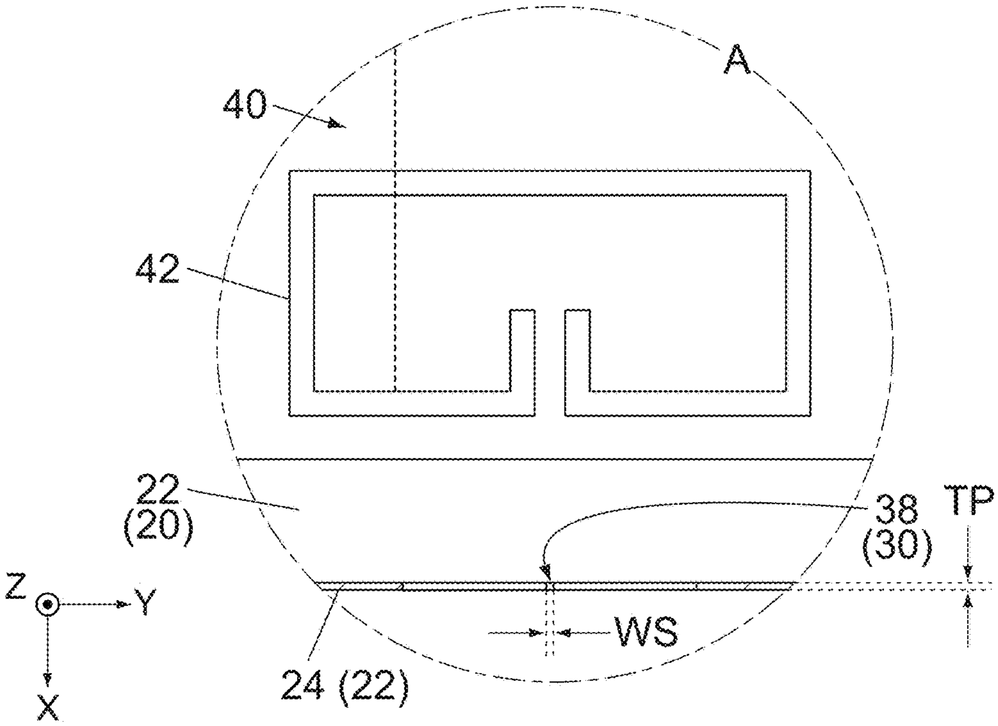
FIG. 6 is an enlarged, cross-sectional view showing a part of the antenna device enclosed by chain dotted line of FIG. 5.

Referring to FIGS. 5 and 6, the antenna element 42 of the present embodiment is a split-ring resonator formed on the upper surface of the printed circuit board 40. Moreover, the antenna element 42 of the present embodiment is a 2.4 GHz single-band antenna. However, the antenna element 42 of the present invention is not specifically limited. For example, the antenna element 42 may be a dipole antenna. The frequency band of the antenna element 42 is not limited to the 2.4 GHz band.

Referring to FIG. 5, the printed circuit board 40 of the present embodiment extends along a horizontal plane perpendicular to an up-down direction. The up-down direction of the present embodiment is the gravity direction and the Z-direction. In the present embodiment, "upward" means the positive Z-direction, and "downward" means the negative Z-direction. The horizontal plane of the present embodiment is the XY-plane.

The antenna element 42 of the present embodiment is located on the upper surface of the printed circuit board 40 and extends along the horizontal plane. The thus-formed antenna element 42 radiates a horizontally polarized wave which has a plane of polarization in parallel to the ground. In detail, the radio wave radiated from the antenna element 42 has an electric field EF which oscillates in parallel to the ground. However, the present invention is not limited thereto. For example, the printed circuit board 40 may extend along a vertical plane (XZ-plane) in parallel to the up-down direction, and the antenna element 42 may extend along the vertical plane. More specifically, the case 20 may be arranged so that the illustrated printed circuit board 40 extends along the vertical plane.

Summarizing the explanation described above, the antenna element 42 is configured to radiate the radio wave with the predetermined frequency which has a plane of polarization in parallel to a predetermined plane. The predetermined plane of the present embodiment is the horizontal plane (XY-plane) in parallel to the ground. However, the present invention is not limited thereto. For example, the predetermined plane may be the vertical plane (XZ-plane) perpendicular to the ground.

Figure 2:
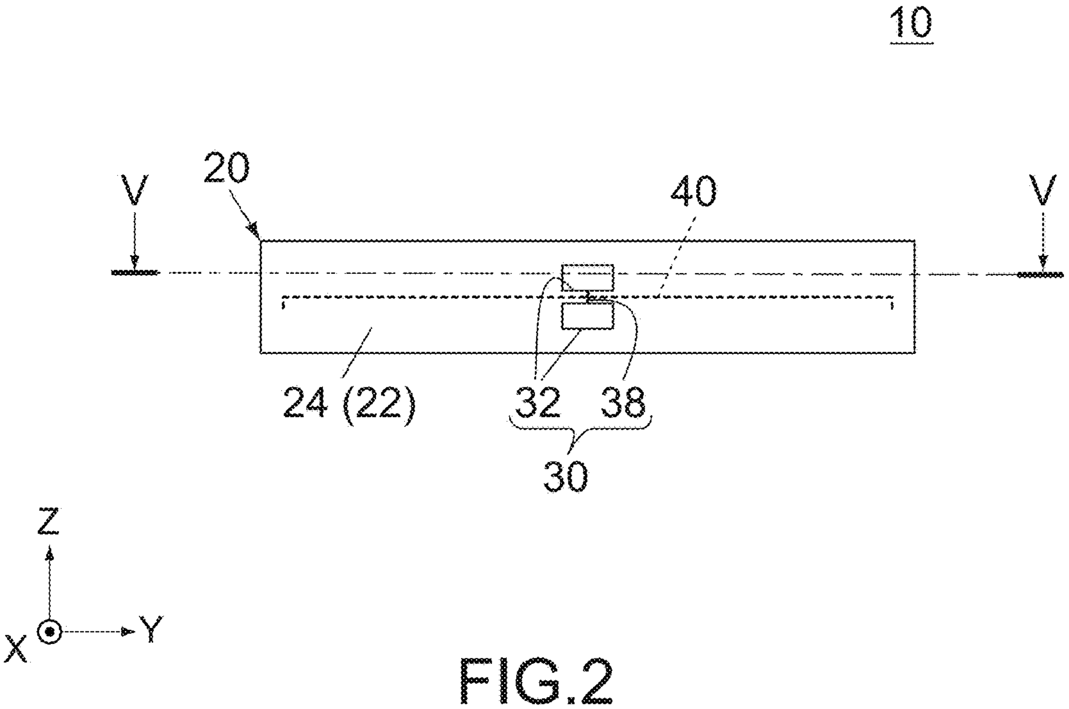
FIG. 2 is a front view showing the antenna device of FIG. 1, wherein a position of an upper surface of a hidden circuit board is illustrated with dashed line.

As shown in FIGS. 1 and 2, the case 20 has a predetermined plate 24. In the present embodiment, the predetermined plate 24 is one of the metal plates 22. More specifically, the predetermined plate 24 is a front plate of the case 20 in a front-rear direction perpendicular to the up-down direction. Thus, the predetermined plate 24 is neither an upper plate nor a lower plate of the case 20. The front-rear direction of the present embodiment is the X-direction. In the present embodiment, "forward" means the positive X-direction, and "rearward" means the negative X-direction.

The predetermined plate 24 is formed with a predetermined opening 30. The predetermined opening 30 is a hole which passes through the predetermined plate 24 in the front-rear direction. Thus, the case 20 is formed with the predetermined opening 30 which is a hole. The case 20 of the present embodiment is formed with no hole except for the predetermined opening 30. The antenna element 42 of the present embodiment is completely enclosed by the conductive body, or the metal plates 22, except for the predetermined opening 30. However, the present invention is not limited thereto. For example, one or more of the metal plates 22 may be formed with a plurality of small holes for discharging heat.

Figure 3:
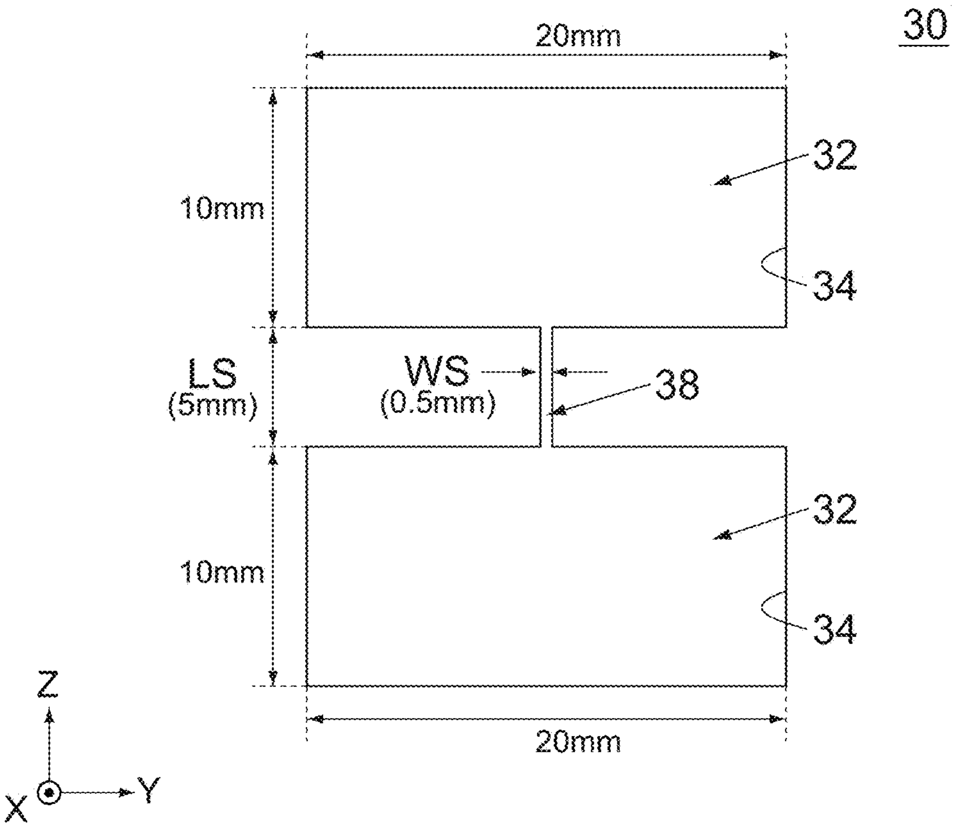
FIG. 3 is a front view showing an example of a predetermined opening of the antenna device of FIG. 2.

Referring to FIGS. 1 to 3, the predetermined opening 30 has two main openings 32 and a coupling opening 38. The two main openings 32 are apart from each other in a first direction perpendicular to the predetermined plane (XY-plane). The first direction of the present embodiment is the up-down direction and the Z-direction. However, the first direction is not limited to that of the present embodiment, provided that the first direction is perpendicular to the predetermined plane. For example, in an instance where the antenna element 42 radiates a vertically polarized wave, the predetermined plane may be the XZ-plane, and the first direction may be a lateral direction perpendicular to the predetermined plane (XZ-plane). The lateral direction of the present embodiment is the Y-direction.

Referring to FIG. 3, the coupling opening 38 couples the two main openings 32 together in the first direction (Z-direction). The coupling opening 38 has a size (width WS) smaller than another size of each of the main openings 32 in a second direction (Y-direction) perpendicular to the first direction.

Figure 4:
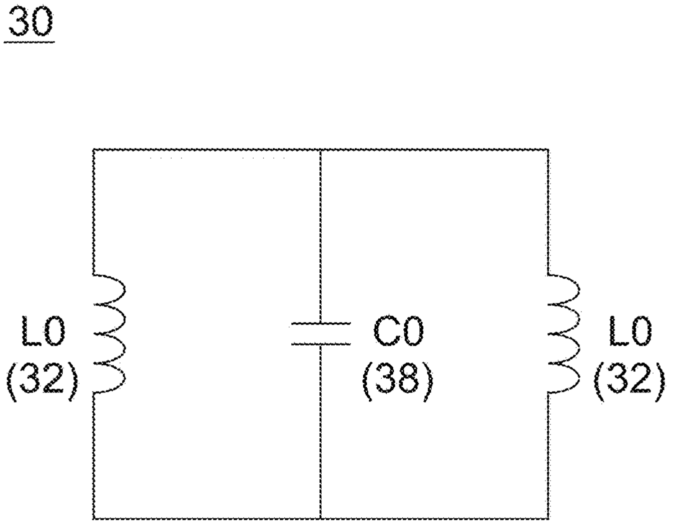
FIG. 4 is a view showing an LC resonator formed by the predetermined opening of FIG. 3.

Referring to FIG. 4 together with FIG. 3, the predetermined opening 30 with the aforementioned structure works as an LC resonator which has an inductance component L0 mainly formed of the main openings 32 and a capacitance component C0 mainly formed of the coupling opening 38. More specifically, the predetermined opening 30 works as a split-ring resonator.

Referring to FIGS. 5 and 6 together with FIGS. 3 and 4, when the radio wave radiated from the antenna element 42 is propagated to the predetermined opening 30, an induced current corresponding to the radio wave radiated from the antenna element 42 flows through the inner edge located around the predetermined opening 30. When the predetermined frequency of the radio wave radiated from the antenna element 42 is substantially equal to the resonant frequency of the LC resonator formed of the predetermined opening 30, the LC resonator is excited and thereby radiates the radio wave with the predetermined frequency outward from the case 20.

Referring to FIGS. 1, 3 and 4, the LC resonator which is formed as described above resonates with various radio waves having various frequencies by adjusting the shapes and the sizes of the main openings 32 and the coupling opening 38, for example, with no change of the height of the case 20. In detail, the resonant frequency of the illustrated LC resonator is inversely proportional to the square root of L0×C0. The value of L0 becomes larger as the length of inner edge 34 of each of the main openings 32 is made longer and becomes smaller as the length of the inner edge 34 is made shorter. The value of C0 becomes smaller as the length LS of the coupling opening 38 is made shorter or as the width WS of the coupling opening 38 is made wider. The value of C0 becomes larger as the length LS is made longer or as the width WS is made narrower. For example, the resonant frequency of the LC resonator can be made equal to the predetermined frequency of the antenna element 42 by narrowing the width WS while the height of the predetermined opening 30 is kept low.

As described above, the predetermined opening 30 of the present embodiment forms the split-ring resonator which resonates at the predetermined frequency. Moreover, the predetermined opening 30 of the present embodiment is configured to radiate a radio wave, which corresponds to the radio wave radiated from the antenna element 42, outward from the case 20. The present embodiment provides the antenna device 10 comprising the case 20 formed with the opening which corresponds to the radio wave of the antenna element 42 and which can be reduced in height.

Figure 7:
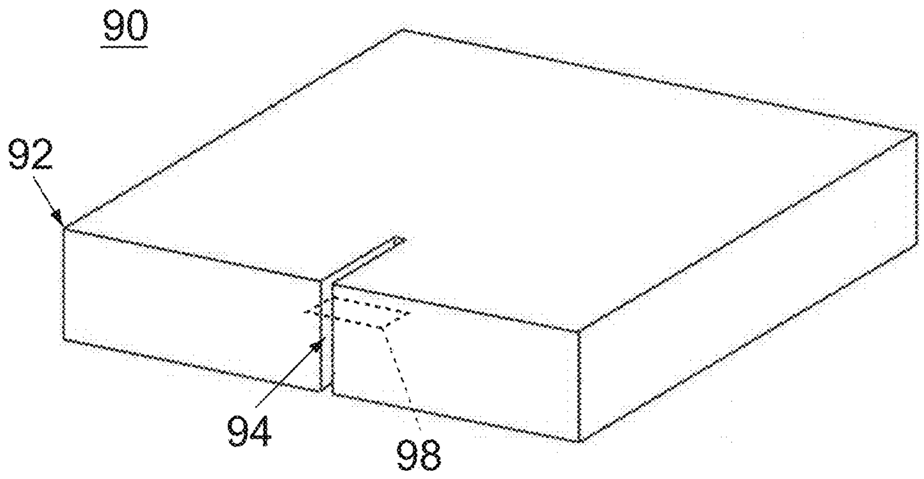
FIG.7 PRIOR ART
FIG. 7 is a perspective view showing an antenna device of Patent Document 1, wherein an outline of an antenna element arranged in a case is illustrated with dashed line.

Referring to FIG. 3, the length of the inner edge 34 of each of the illustrated main openings 32 is 59.5 mm. In the illustrated coupling opening 38, the width WS is 0.5 mm, and the length LS is 5 mm. The illustrated predetermined opening 30 has a height of 25 mm which is equal to or less than half a necessary height of a slot antenna shown in FIG. 7. Although the predetermined opening 30 has a reduced height as described above, the predetermined opening 30 can radiate the radio wave with frequency of 2.4 GHZ, which corresponds to the antenna element 42 of the present embodiment, outward from the case 20.

According to the present embodiment, each of the main openings 32 has a rectangular shape. The coupling opening 38 linearly extends along the first direction (Z-direction). The coupling opening 38 has a first size (length LS) in the first direction and a second size (width WS) in the second direction (Y-direction). The first size is larger than the second size. The predetermined opening 30 which has a simple shape as described above can be easily formed. However, the present invention is not limited thereto, but the shape of the predetermined opening 30 can be variously modified, provided that the predetermined opening 30 can form a split-ring resonator having a resonant frequency which is equal to the predetermined frequency of the antenna element 42.

The two main openings 32 of the present embodiment have shapes same as each other. In detail, the two main openings 32 have congruent shapes same as each other in a plane defined by the first direction (Z-direction) and the second direction (Y-direction). According to this structure, the total area of the main openings 32 can be minimized when the resonant frequency of the LC resonator is set to a desired value. Thus, the predetermined opening 30 can be easily reduced in size in the first direction. However, the present invention is not limited thereto. For example, the two main openings 32 may have shapes different from each other.

Referring to FIG. 6, the case 20 of the present embodiment is formed of the metal plates 22 as previously described. The metal plates 22 of the present embodiment have thicknesses TP same as each other. In particular, the predetermined plate 24, which is one of the metal plates 22, has the substantially constant thickness TP regardless of its position. The size (width WS) of the coupling opening 38 in the second direction (Y-direction) is equal to or less than four times the thickness TP of the metal plate 24. According to this structure, the value of the capacitance component C0 (see FIG. 4) formed by the coupling opening 38 can be easily made large. However, the present invention is not limited thereto, but the relationship between the width WS and the thickness TP can be modified as necessary.

Referring to FIG. 3, according to the present embodiment, the size (width WS) of the coupling opening 38 in the second direction (Y-direction) is equal to or less than one-fiftieth the length of the inner edge 34 of each of the main openings 32. According to this structure, the value of the capacitance component C0 (see FIG. 4) formed by the coupling opening 38 can be easily made large. However, the present invention is not limited thereto, but the relationship between the width WS and the length of the inner edge 34 of each of the main openings 32 can be modified as necessary.

Referring to FIG. 1, the antenna device 10 can be further variously modified in addition to the already described various modifications. For example, the predetermined opening 30 of the present embodiment is visible from outside.

However, the predetermined opening 30 may be covered by a cover made of insulator such as resin. In other words, the predetermined opening 30 may be invisible from outside.

In the present embodiment, the antenna element 42 arranged in the case 20 consists of only one single-band antenna, and the number of the predetermined opening 30 formed on the case 20 is one. However, the present invention is not limited thereto. For example, the antenna element 42 may include two or more single-band antennas which radiate radio waves with predetermined frequencies different from each other. The antenna element 42 may be a multi-band antenna which radiates two or more radio waves with predetermined frequencies different from each other. In these instances, the case 20 may be formed with two or more of the predetermined openings 30 having resonant frequencies which correspond to two or more predetermined frequencies, respectively.

Referring to FIG. 2, the printed circuit board 40 of the present embodiment is located at the middle of the case 20 in the up-down direction. In detail, the position of the upper surface of the printed circuit board 40 in the up-down direction is equal to the position of the middle point of the coupling opening 38 in the up-down direction. In other words, the antenna element 42 (see FIG. 5) is located at the middle of the coupling opening 38 in the up-down direction. This arrangement is preferable from a viewpoint of radiating the radio wave with the predetermined frequency outward from the case 20. However, the present invention is not limited thereto. For example, the position of the upper surface of the printed circuit board 40 in the up-down direction may be vertically shifted in some extent relative to the middle point of the coupling opening 38 in the up-down direction.

What is claimed is:

1. An antenna device comprising:

a case made of conductor;

a printed circuit board arranged in the case and extending along a predetermined plane; and an antenna element provided on a surface of the printed circuit board, wherein:

the antenna element is arranged in the case and is configured to radiate a radio wave with a predetermined frequency which has a plane of polarization in parallel to the predetermined plane;

the case is formed with a predetermined opening;

the predetermined opening has two main openings and a coupling opening;

the two main openings are apart from each other in a first direction perpendicular to the predetermined plane;

the coupling opening couples the two main openings together in the first direction;

the coupling opening has a size smaller than another size of each of the main openings in a second direction perpendicular to the first direction;

the predetermined opening forms a split-ring resonator which resonates at the predetermined frequency; and the predetermined opening is configured to radiate a radio wave, which corresponds to the radio wave radiated from the antenna element, outward from the case.

2. The antenna device as recited in claim 1, wherein:

each of the main openings has a rectangular shape;

the coupling opening linearly extends along the first direction;

the coupling opening has a first size in the first direction and a second size in the second direction; and the first size is larger than the second size.

3. The antenna device as recited in claim 2, wherein the two main openings have shapes same as each other.

4. The antenna device as recited in claim 2, wherein:

the case is formed of a metal plate; and a size of the coupling opening in the second direction is equal to or less than four times a thickness of the metal plate.

5. The antenna device as recited in claim 2, wherein a size of the coupling opening in the second direction is equal to or less than one-fiftieth a length of an inner edge of each of the main openings.

6. The antenna device as recited in claim 1, wherein the two main openings have shapes same as each other.

7. The antenna device as recited in claim 1, wherein:

the case is formed of a metal plate; and a size of the coupling opening in the second direction is equal to or less than four times a thickness of the metal plate.

8. The antenna device as recited in claim 1, wherein a size of the coupling opening in the second direction is equal to or less than one-fiftieth a length of an inner edge of each of the main openings.

* * * * *